(12) United States Patent
Atkinson

(10) Patent No.: US 7,173,450 B2
(45) Date of Patent: Feb. 6, 2007

(54) BUS CONTROLLER

(75) Inventor: Lee W. Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 10/858,129

(22) Filed: Jun. 1, 2004

(65) Prior Publication Data

US 2005/0264316 A1 Dec. 1, 2005

(51) Int. Cl.
*H03K 17/16* (2006.01)

(52) U.S. Cl. .............................. 326/30; 326/83; 326/86

(58) Field of Classification Search ................. 326/30, 326/83, 86; 327/108, 175, 134, 170; 713/106, 713/323, 501, 500, 324; 280/834; 379/102.01
See application file for complete search history.

(56) References Cited

U.S. PATENT DOCUMENTS

| | | | |
|---|---|---|---|
| 4,085,449 A * | 4/1978 | Walsh et al. ................. 375/222 |
| 4,371,181 A * | 2/1983 | Monigold et al. ........... 280/834 |
| 4,980,836 A * | 12/1990 | Carter et al. ................ 713/322 |
| 5,003,205 A | 3/1991 | Kohda et al. ................. 326/81 |
| 5,089,722 A | 2/1992 | Amedeo ....................... 326/87 |
| 5,097,152 A | 3/1992 | Kohda et al. ................. 326/80 |
| 5,153,450 A | 10/1992 | Ruetz ........................... 326/87 |
| 5,153,457 A | 10/1992 | Martin et al. ................. 326/84 |
| 5,162,672 A | 11/1992 | McMahan et al. ............ 326/86 |
| 5,239,652 A * | 8/1993 | Seibert et al. ............... 713/323 |
| 5,247,655 A * | 9/1993 | Khan et al. .................. 711/106 |
| 5,319,258 A | 6/1994 | Ruetz ........................... 326/21 |
| 5,589,789 A | 12/1996 | Kamiya ....................... 327/278 |
| 5,677,639 A | 10/1997 | Masiewicz .................... 326/82 |
| 5,732,027 A | 3/1998 | Arcoleo et al. ......... 365/189.05 |
| 5,751,161 A * | 5/1998 | Wei et al. ..................... 326/30 |
| 5,781,767 A * | 7/1998 | Inoue et al. ................ 713/500 |
| 5,784,598 A * | 7/1998 | Griffith ....................... 713/501 |
| 5,864,506 A | 1/1999 | Arcoleo et al. ......... 365/189.05 |
| 6,054,881 A | 4/2000 | Stoenner ...................... 327/112 |
| 6,177,810 B1 | 1/2001 | Loeffler ........................ 326/87 |
| 6,204,683 B1 * | 3/2001 | Falconer ....................... 326/30 |
| 6,208,168 B1 | 3/2001 | Rhee ............................. 326/83 |
| 6,292,010 B1 | 9/2001 | Persons et al. ............. 324/765 |
| 6,292,014 B1 * | 9/2001 | Hedberg ....................... 326/30 |
| 6,378,077 B1 * | 4/2002 | Atkinson .................... 713/324 |
| 6,469,539 B2 | 10/2002 | Kim .............................. 326/30 |
| 6,529,589 B1 * | 3/2003 | Nelson et al. .......... 379/102.01 |
| 6,573,746 B2 | 6/2003 | Kim et al. .................... 326/30 |
| 6,603,684 B2 | 8/2003 | Im ......................... 365/189.05 |
| 6,707,280 B1 | 3/2004 | Liu et al. .................... 323/224 |

OTHER PUBLICATIONS

INTEL, "Intel 875P Chipset", *Datasheet*, Intel 82875P Memory Controller Hub (MCH),(Apr. 2003),140-141.

* cited by examiner

*Primary Examiner*—Jean Bruner Jeanglaude

(57) ABSTRACT

A bus has two power consumption modes. A variable bus termination impedance is controlled to provide different bus termination impedances. A controller is coupled to the bus and includes a variable clock having different frequencies that are selectively provided to the controller. The impedance is increased or decreased responsive to the frequency being provided to the controller.

30 Claims, 3 Drawing Sheets

BUS CONTROLLER

BACKGROUND

High speed input/output (I/O) busses cause considerable power to be consumed by I/O buffers in dynamic random access memory (DRAM) chips. Lower power complimentary metal oxide semiconductor (CMOS) busses have not supported the high edge rates used at higher frequencies, such as 400 MHz or 800 MHz data rates currently in use. Such busses have been modified such that they no longer switch rail to rail, causing an increase in current drain, and hence heat generation. Thevenin terminations on the I/O bus have been used to maintain fast edge rates. Such terminations reference the bus output to a low impedance, but cause excess power draw when lower performance is expected from the bus and memory chip.

Prior methods of power reduction have been suggested for thermal control in memory devices. One simple method involves lowering the speed of the synchronous or clocked bus. This method does relieve thermal stress by lowering the power consumption rate of the system, but it only acts to delay the overall power consumption by delaying fetches from the memory device.

Another prior method involves momentarily disabling the memory device itself. This is referred to as bandwidth throttling, and acts to periodically disable the memory device in response to either sensed or perceived high temperatures. Bandwidth throttling has also been used in response to an activity detector detecting too much traffic on the bus. Bandwidth throttling reduces potential performance obtained from the memory device.

DETAILED DESCRIPTION

In the following description, reference is made to the accompanying drawings that form a part hereof, and in which is shown by way of illustration specific embodiments in which the described subject matter may be practiced. These embodiments are described in sufficient detail to enable those skilled in the art to practice the described subject matter, and it is to be understood that other embodiments may be utilized and that structural, logical and electrical changes may be made without departing from the scope of the described subject matter. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

An optimal power configuration is realized by selectively decreasing the power consumed by the I/O of a high speed bus device. The bus may be synchronous or asynchronous. Short transfer times of high speed busses, such as those operating in the gigahertz range use aggressive edge rates. The output drive of a CMOS gate is increased to drive a faster edge rate against a parasitic capacitance (Cp) of the bus. Since the conductor of the bus itself becomes inductive, the high drive strength alone would cause signal quality problems. Thevenin terminations may be used on the bus itself to match the signal impedance and limit ringing of the fast signals.

Figure 1:
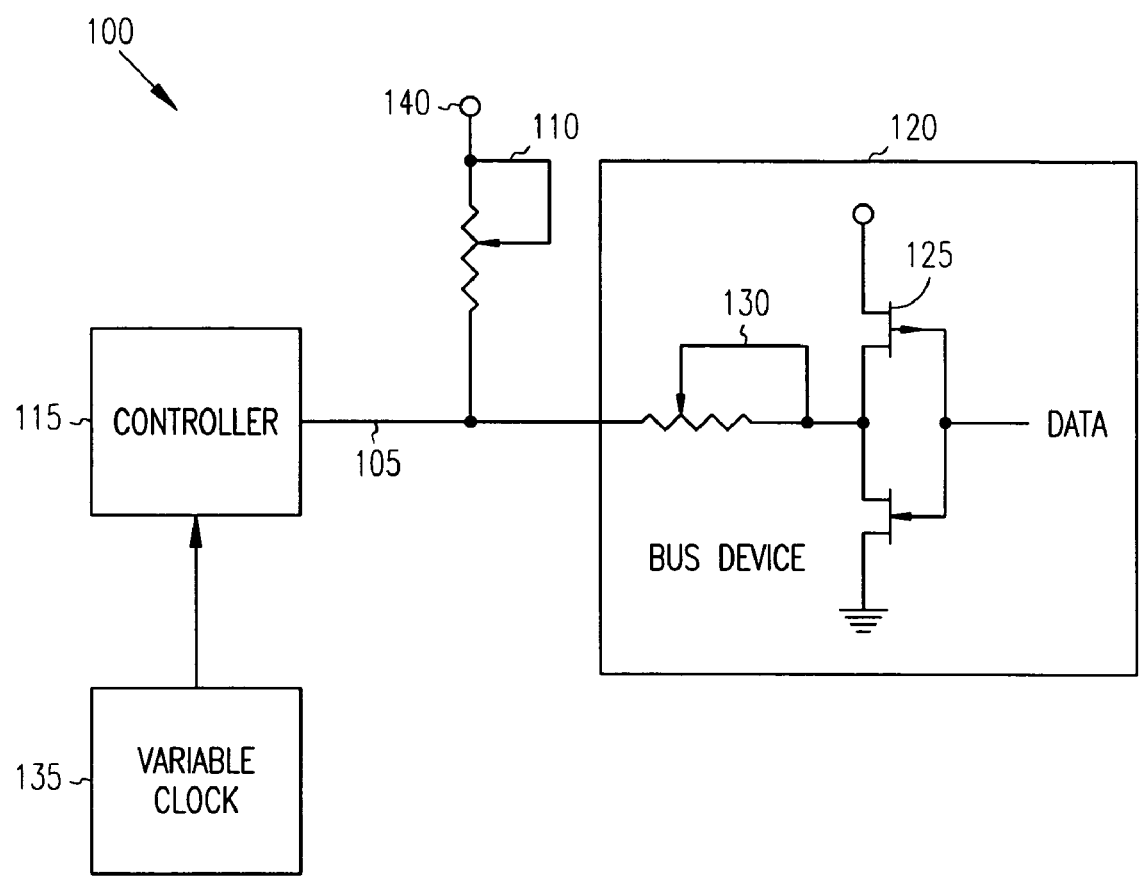
FIG. 1 is a block diagram of a system including a high speed bus according to an example embodiment of the invention.

FIG. 1 is a block diagram of a system 100 including a synchronous bus 105 according to an example embodiment of the invention. Bus 105, in one embodiment is a synchronous bus that implements a SSTL (Series Stub Terminated Logic) signaling method. Bus 105 has a variable value termination resistor 110 coupled to it. Bus 105 is used to transmit signals between a controller 115 and a bus device 120. Bus device 120 comprises a driver 125, such as a CMOS dual gate FET. Multiple selectable stages of the driver may be used to vary the output power of the driver. The driver 125 is coupled to the bus 105 via a variable drive resistor 130.

A variable clock 135 is coupled to the controller 115. Clock 135 in one embodiment has two different frequencies, which may be referred to as a high setting and a low setting. The high setting provides a higher frequency, such as 533 MHz, and the low setting provides a lower frequency, such as 400 MHz. The controller also controls the values of the variable termination resistor 110 and the variable drive resistor 130 depending on whether the frequency is high or low.

In the high setting, the signaling on the bus utilizes high static power. Current is continuously sourced to maintain a logic high or "1", and constantly sunk to maintain a logic low or "0". The current passed from a termination voltage 140, referred to as VTT may be significant. Since some busses are now 64 to 128 bits wide, the amount of power used in output termination can create several watts of power consumption.

To reduce the power consumption when lower performance may be appropriate, the clock is set to the low frequency, resulting in a decrease in the number of switching times on the bus. This may be done by controller 115 in one embodiment in response to user commands, or sensed or expected utilization of the bus. The output drive of the bus device 120 may also be decreased to a lower level. This decreases both the AC and DC drive current on the bus. Optionally, the bus terminations themselves are changed or even removed so as to remove the DC load component.

When the bus device is a DRAM, during normal data reads, the DRAM device outputs data to the memory controller in high power mode. The clock is fast. In low power mode, the memory controller is slowed down by the clock, easing the timing expectations on the bus. The DRAM output drive can be decreased, and the termination loading reduced or eliminated.

In one embodiment, the bus is bidirectional. During writes to DRAM, data flows from the controller to the DRAM. The memory controller drive current may also be reduced as long as the clocking speed is slow.

The lower power mode may be dynamically and reversibly applied. Typical stimulus for changing the power consumption of the bus include a manual power conservation being asserted. For example, in a notebook computer, the bus may be set up for high power, high performance while coupled to AC power. Lower performance may be utilized when the notebook computer is operating off of battery power.

Power conservation may be applied in the event that a computer system incorporating the bus and multiple devices is detected as overheating. For example, DRAM may be added to the bus in a fairly dense manner, with little provision made for proper conduction of heat. This may put an entire computer system at risk. Temperature sensors may be used to identify such risk, and apply power conservation by implementing the low power mode. Power conservation may also be applied when little bus traffic is observed.

Figure 2:
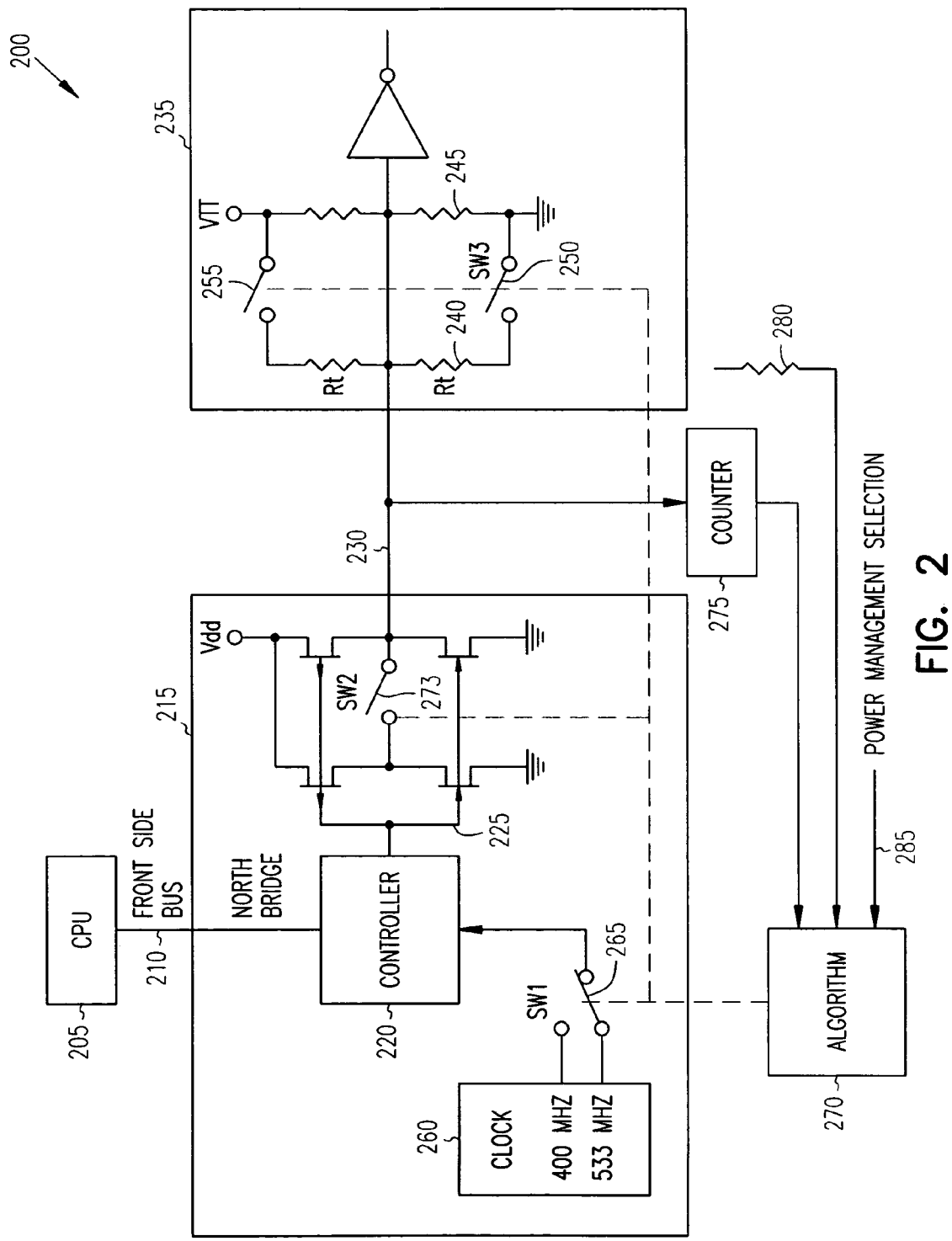
FIG. 2 is a more detailed block diagram of a system including a high speed bus according to an example embodiment of the invention.

FIG. 2 is a block diagram of an example computer system 200 incorporating an embodiment of the invention. System 200 has a central processing unit CPU 205 coupled by a front side bus 210 to a bridge device 215. In one embodiment, bridge device 215 is a North bridge, and interfaces a controller 220, such as a memory controller to CPU 205. In some embodiments, the memory controller 220 is integrated into the CPU itself.

The controller 220 is coupled via an interface driver 225 and bus 230 to a bus device, such as dynamic random access memory (DRAM) 235. In one example embodiment, the DRAM 235 is a Micron Inc. DDR-2 DRAM. The DDR-2 DRAM has "on die termination," with 2 possible termination resistor networks indicated at 240 and 245. Each resistor is approximately 150 ohms in one embodiment. A pair of switches indicated at 250 and 255, when closed, provides a bus termination that is effectively 75 ohms terminated to Vss (ground) and to VDDQ (the operational voltage of the DRAM). When switches 250 and 255 are closed, the resistor network 240 is coupled to the bus, effectively doubling the termination resistance in one embodiment. In further embodiments, the resistor values are other than equal.

The operating speed of the memory controller 220 is set by a clock 260 and third switch 265 to either approximately 400 mhz or 533 mhz. These frequencies may be significantly varied for different types of devices and busses. Future busses are likely to have even higher operating frequencies available. The operating frequency is related to the speed of switching utilized for high and low states on the bus. Higher frequencies use faster switching.

In further embodiments, an algorithm 270 provides outputs that are used to control the frequency selection switch 265, and resistor network switches 250 and 255. The algorithm may be implemented on many different logic platforms, including CPU 205 or controller 220. The algorithm may also be used to control a further switch 273 that is used to include a second stage in interface driver 225.

A counter 275 may be used to monitor bus traffic, and provide indications of the amount of bus traffic to the algorithm for use in determining an appropriate frequency of operation. Further, a thermistor 280 is optionally placed proximate the bus device 235 to monitor operating temperatures and to potentially slow down the operating frequency to reduce power consumption and correspondingly heat generation. The thermistor 280 provides information about the operating temperature to the algorithm for use in determining the frequency of operation if desired. A further input may be provided externally to the algorithm for directly selecting the frequency of operation, such as by direct user input or other power management algorithms.

Figure 3:
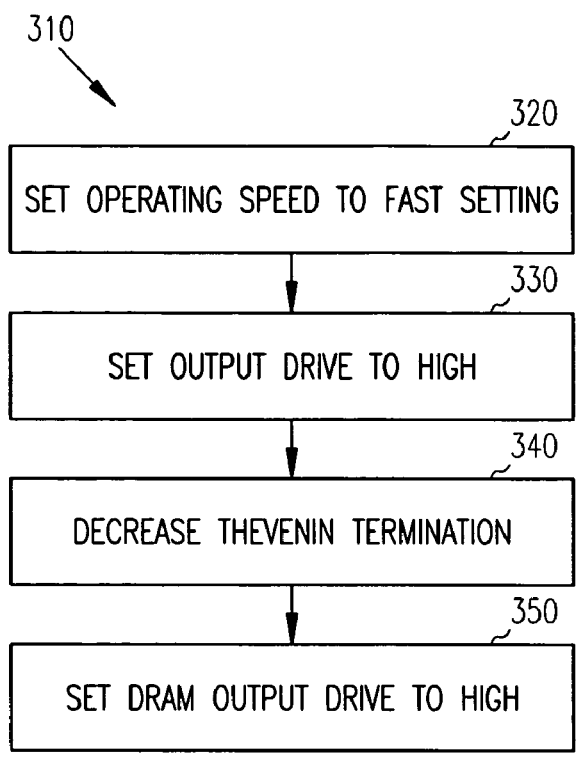
FIG. 3 is a flowchart diagram of an algorithm for placing a bus into a high power mode of operation according to an example embodiment of the invention.

FIG. 3 is a flow chart example 310 of algorithm 270 configuring the system for a high performance mode. At 320, the operating speed of the memory controller 220 is at its fast setting. Switch 265 is set to the fast clock speed of approximately 533 MHz. At 330, the memory controller interface driver 225 is enabled for the highest possible output drive by closing switch 273 to engage parallel transistors. At 340, the Thevenin termination inside the DRAM 235 is set to the highest current drive by closing switches 250 and 255. This may be done in one embodiment by setting appropriate bits in an extended mode register of the DRAM to obtain a termination resistance of 75 ohms, or other value depending on the values of resistors used. At 350, the output drive of the DRAM may also be set to maximum by setting a corresponding bit in the extended mode register of the DRAM.

Figure 4:
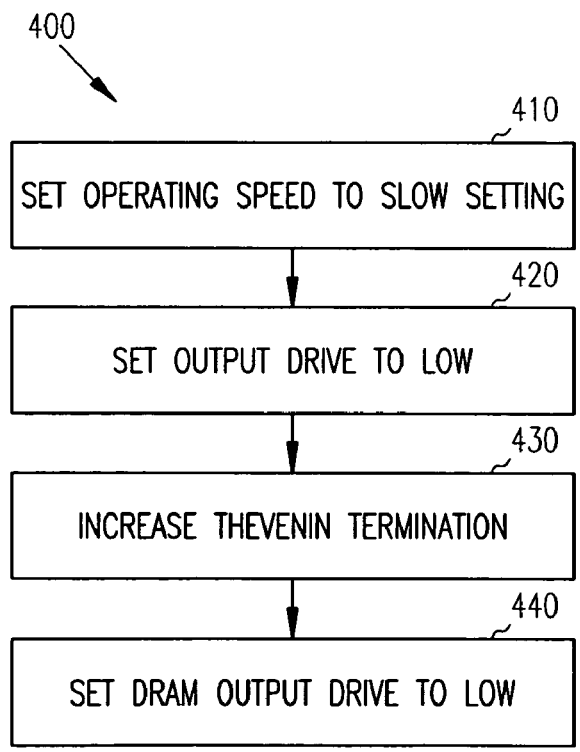
FIG. 4 is a flowchart diagram of an algorithm for placing a bus into a low power mode of operation according to an example embodiment of the invention.

FIG. 4 is a flow chart 400 showing operation of the algorithm 270 in configuring the system 200 for low power mode. At 410, switch 265 is set to the lower frequency, 400 MHz. At 420, switch 273 is opened, decreasing the output drive of the interface driver 225 by removing one of the parallel transistor stages. At 430, switches 250 and 255 are opened, increasing the termination source to a 150 ohm load in one embodiment. At 440, the DRAM output drive is optionally set to low by removing one or more of the drive stages.

The low power mode may be entered as a function of many different factors. The device 235 temperatures may be too high. Thermister 280 provides an indication, such as a signal representative of temperature which may be used to determine the device is at an unsafe temperature. The algorithm 270 receives information from the thermister 280 and configures the system 200 for low power mode in accordance with the flow chart 400.

The amount of activity on the bus from the device, such as DRAM 235 may be either very high or very low. Counter 275 measures the amount of DRAM activity over a duration. If the amount of activity is very high, then DRAM overheating is suggested, and the algorithm may determine to configure the system for low power mode. If the amount of activity is very low, the algorithm may determine that the system may operate at lower than high performance. If so, the algorithm may place the system in the low power mode to lower performance. The system then becomes more efficient in power consumption without sacrificing overall system performance. This aspect of the algorithm may be useful in large systems with multiple bus devices that are all generating heat. If all such devices were operating in high performance mode, more heat may be generated than can be effectively handled by the system.

Various manual settings may indicate a desire for a power conservation mode as indicated at 285. Reasons may include detection of battery versus AC line power, lower CPU speed settings, acoustic requirements where less cooling fan noise is desired, or detection of other manual power conservation settings.

In some instances, the algorithm 270 may decide that the system temperature is very low and can "margin" the timing. When silicon is cool, it will inherently operate faster. The algorithm receives information, such as by reading the thermistor 280 and determines that the termination strength can be reduced—without reducing the speed—of the memory controller. In other words, the Algorithm may decide that the system has adequate margin and may use something other than the high output drive to work reliably. The algorithm will then open switches 273 to decrease the drive, and open switches 250 and 255 to decrease the termination strength. The drive strength of the device may also be decreased by the algorithm via the extended mode register. The decrease may be accomplished in the same manner as the decrease in drive strength of the controller interface driver 225.

The invention claimed is:

1. A system comprising:
   a bus;
   a controller coupled to the bus;
   a variable clock coupled to the controller, the variable clock having different frequencies that are selectively provided to the controller; and
   a variable bus termination impedance coupled to the bus, wherein the impedance is increased or decreased responsive to the frequency being provided to the controller.

2. The system of claim 1 and further comprising an adjustable output driver coupled to the controller and to the bus.

3. The system of claim 2 wherein the adjustable driver has an output that is adjusted as a function of the clock frequencies.

4. The system of claim 3 wherein the driver comprises a two stage complimentary metal oxide semiconductor field-effect transistor (CMOS FET) driver having a switch coupled thereto to selectively uncouple one of the stages from the bus.

5. The system of claim 1 and further comprising a device coupled to the bus.

6. The system of claim 5 and further comprising a thermistor for sensing temperature.

7. The system of claim 1 and further comprising a counter for detecting volume of bus traffic.

8. The system of claim 1 and further comprising a power management selection line for receiving external power management instructions.

9. A device comprising:
   a controller;
   an adjustable output driver coupled to the controller for driving signals on a bus at different power levels;
   a variable dock coupled to the controller, the variable dock having different frequencies that are selectively provided to the controller; and
   means for modifying a termination impedance of the bus.

10. The device of claim 9 wherein the means for modifying the termination impedance of the bus comprises an output that controls a switch.

11. The device of claim 10 wherein the switch controls a resistive termination network.

12. The device of claim 9 wherein the means for modifying the termination impedance of the bus comprises an output for coupling to an extended mode register of a device coupled to the bus.

13. The device of claim 9 wherein the means for modifying the termination impedance of the bus comprises an algorithm that controls the adjustable output driver, variable dock, and termination impedance of the bus responsive to selected modes of operation.

14. A method of modifying power consumption, the method comprising:
   determining that a bus should operate at a different power consumption mode;
   modifying a termination impedance of the bus;
   modifying a clock rate for the bus; and
   modifying an output drive level.

15. The method of claim 14 wherein the different power consumption mode is a lower power consumption mode and the termination impedance is increased, the clock rate is decreased, and the output drive level is decreased.

16. The method of claim 14 wherein the different power consumption mode is a higher power consumption mode and the termination impedance is decreased, the clock rate is increased, and the output drive level is increased.

17. The method of claim 14 wherein an output drive level of each of multiple devices attached to the device is modified.

18. The method of claim 14 wherein power consumption is modified as a function of detected temperature proximate the device.

19. The method of claim 14 wherein power consumption is modified as a function of detected volume of traffic on the bus.

20. The method of claim 19 wherein power consumption is reduced when a high volume of traffic is detected.

21. The method of claim 19 wherein power consumption is reduced when a low volume of traffic is detected and performance is lower than high performance.

22. A computer readable medium having instructions stored thereon for causing a computer to implement a method of modifying power consumed, the method comprising:
   determining that a bus should operate at a different power consumption mode;
   modifying a termination impedance of the bus;
   modifying a clock rate for the bus; and
   modifying an output drive level.

23. The computer readable medium of claim 22 wherein the different power consumption mode is a lower power consumption mode and the termination impedance is increased, the clock rate is decreased, and the output drive level is decreased.

24. A system comprising:
   a central processing unit;
   a bus;
   a memory controller coupled to the bus and to the central processing unit;
   a variable clock coupled to the memory controller, the variable clock having different frequencies that are selectively provided to the controller;
   a memory device coupled to the bus that sends and receives bus traffic to and from the controller as a function of the variable clock frequencies;
   an adjustable output driver coupled to the bus; and
   a variable bus impedance coupled to the bus, wherein the impedance is increased or decreased responsive to the frequency being provided to the controller.

25. The system of claim 24 wherein the adjustable driver has an output that is adjusted as a function of the clock frequencies.

26. The system of claim 25 wherein the adjustable driver is coupled between the memory controller and the bus.

27. The system of claim 26 and further comprising an adjustable driver coupled between the device and the bus.

28. The system of claim 24 and further comprising a thermistor for sensing temperature.

29. The system of claim 24 and further comprising a counter for detecting volume of bus traffic.

30. The system of claim 24 and further comprising a power management selection line for receiving external power management instructions.

n

* * * * *

UNITED STATES PATENT AND TRADEMARK OFFICE
CERTIFICATE OF CORRECTION

PATENT NO.         : 7,173,450 B2                                         Page 1 of 1
APPLICATION NO. : 10/858129
DATED              : February 6, 2007
INVENTOR(S)        : Lee W. Atkinson It is certified that error appears in the above-identified patent and that said Letters Patent is hereby corrected as shown below:

In column 5, line 49, in Claim 9, delete "dock" and insert -- clock --, therefor.

In column 5, line 50, in Claim 9, delete "dock" and insert -- clock --, therefor.

In column 5, line 66, in Claim 13, delete "dock," and insert -- clock, --, therefor.

In column 8, line 4, in Claim 30, after "instructions." delete "n".

Signed and Sealed this

Third Day of February, 2009

JOHN DOLL
*Acting Director of the United States Patent and Trademark Office*